United States Patent
Baylor

(10) Patent No.: US 6,360,302 B1
(45) Date of Patent: Mar. 19, 2002

(54) METHOD AND SYSTEM FOR DYNAMICALLY CHANGING PAGE TYPES IN UNIFIED SCALABLE SHARED-MEMORY ARCHITECTURES

(75) Inventor: Sandra Johnson Baylor, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,222

(22) Filed: Nov. 5, 1999

(51) Int. Cl.$^7$ ............................................. G06F 12/00

(52) U.S. Cl. ...................... 711/147; 711/120; 711/122; 711/145; 711/148

(58) Field of Search ................................ 711/120, 122, 711/145, 148

(56) References Cited

U.S. PATENT DOCUMENTS

| | | | | |
|---|---|---|---|---|
| 5,710,907 A | * | 1/1998 | Hagersten et al. | 711/148 |
| 5,893,144 A | * | 4/1999 | Wood et al. | 711/122 |
| 5,926,829 A | * | 7/1999 | Hagersten et al. | 711/120 |
| 6,085,295 A | * | 7/2000 | Ekanadham et al. | 711/145 |
| 6,275,900 B1 | * | 8/2001 | Liberty | 711/120 |

FOREIGN PATENT DOCUMENTS

EP             0780769        6/1997

OTHER PUBLICATIONS

Falsafi, et al., "Reactive NUMA: A Design for Unifying S–COMA and CC–NUMA", In Proceedings of the 24th Annual International Symposium on Computer Architecture, pp. 229–240, Denver, CO, Jun. 1997.

Ekanadham, et al., "PRISM: An Integrated Architecture for Scalable Shared Memory", In Proceedings of the Fourth Symposium on High Performance Computer Architecture, Jan., 1998, pp. 140–151.

Saulsbury, et al., "An Argument for Simple COMA", In Proceedings of the 1$^{st}$ Symposium on High Performance Computer Architecture, pp. 276–285, Jan., 1995.

Kuo,et al., "ASCOMA: An Adaptive Hybrid Shared Memory Architecture", In Proceedings of the International Conference on Parallel Processing, pp. 207–216, 1998.

Chiou, et al., "StarT–NG: Delivering Seamless Parallel Computing", In Proceedings of EURO–PAR '95.

(List continued on next page.)

*Primary Examiner*—Do Hyun Yoo
*Assistant Examiner*—Mehdi Namazi
(74) *Attorney, Agent, or Firm*—F. Chau & Associates, LLP

(57) ABSTRACT

According to one aspect of the invention, there is provided a method for dynamically changing page types in a unified scalable shared-memory architecture. The method includes the step of assigning a default page type of a given page as simple cache only memory architecture (SCOMA). Upon n memory references, a first parameter of the given page is calculated. A second parameter of the given page is calculated, when the first parameter is greater than a first threshold. The page type of the given page is dynamically changed to cache-coherent non-uniform memory architecture (ccNUMA), when the second parameter is greater than a second threshold. The first and the second parameters are one of a page reference probability and one minus a page utilization, the second parameter being different than the first parameter. According to another aspect of the invention, the n memory references correspond to all pages. According to yet another aspect of the invention, the n memory references correspond only to the given page.

24 Claims, 3 Drawing Sheets

OTHER PUBLICATIONS

Soundarajan, et al., "Flexible Use of Memory for Replication/Migration in Cache–Coherent DSM Multiprocessors", In Proceedings of the 25$^{th}$ Annual International Symposium on Computer Architecture, pp. 342–355, Barcelona, Spain, Jun., 1998.

Moga, et al., "The Effectiveness of SRAM Network Caches in Clustered DSMs", In Proceedings of the Fourth Annual Symposium on High Performance Computer Architecture, Jan., 1998.

S.J. Baylor, "Unified Scalable Shared–Memory Architectures," Computer Architecture News, vol. 27, No. 1., pp. 10–20, Mar., 1999.

Basu et al., "Enhancing Memory Use in Simple Coma: Multiplexed Simple Coma", In Proceedings of the Fourth Symposium on High Performance Computer Architecture, Jan., 1998.

* cited by examiner

METHOD AND SYSTEM FOR DYNAMICALLY CHANGING PAGE TYPES IN UNIFIED SCALABLE SHARED-MEMORY ARCHITECTURES

BACKGROUND

1. Technical Field

The present invention relates generally to computer processing systems and, in particular, to a method and system for dynamically changing page types in unified scalable shared-memory architectures.

2. Background Description

Scalable shared memory multiprocessors offer significant computing power and have the advantages of ease of use and programmability. Such architectures typically consist of a scalable number of workstation-class nodes connected by an interconnection network. Each node consists of one or more computation units and one or more levels of caching and/or memory. A global address space is used for inter node communication.

In a cache-coherent non-uniform memory architecture (ccNUMA), accessing the physical memory at the local node can be an order of magnitude faster than accessing the remote memory. The relatively long access latencies incurred when accessing the remote memory can prohibitively degrade the performance of such multiprocessors. Local remote access caches (RAC) can be used to address this degradation. An application running on this architecture exhibits the best performance when its working set is contained within the memory hierarchy of the node. Otherwise, repeated remote memory accesses may occur, resulting in potentially prohibitive performance.

While RACs in ccNUMA machines can be used to address the issues associated with long latency remote accesses, these caches are relatively small and, therefore, have limited effectiveness for some applications. These issues can be addressed more effectively by using machines with a simple cache only memory architecture (SCOMA).

SCOMA uses the memory associated with each node as a higher level cache. SCOMA reduces the frequency of long remote memory accesses by migrating and replicating data to the local nodes. SCOMA can quickly adapt to the dynamic memory reference behavior of executing applications, reducing the effective memory access time. In SCOMA, the paging software manages cache space allocation and deallocation. Less hardware is used to maintain data coherence and no cache tag hardware is needed.

SCOMA architectures use the local node memory as the page cache, with the page as the placement granularity. This facilitates improved performance, particularly for applications exhibiting good spatial reference locality. However, SCOMA suffers from increased hardware costs for the coherence controller and from increased memory consumption and low page utilization. Dynamically mixed page types allow both schemes to exist concurrently on a page basis. This facilitates performance improvements by exploiting the advantages of both ccNUMA and SCOMA architectures in a unified architecture.

Unified architectures can contain mechanisms to facilitate the dynamic typing of pages in local nodes. Unified architectures dynamically adapt between ccNUMA and SCOMA architectures according to the reference patterns of the executing programs. This dynamic adaptation results in better performance because the unified architecture has the ccNUMA advantages of relatively low memory allocation overhead, fine-grain spatial locality, short term temporal locality and minimizing coherence miss traffic. The unified architecture also has the SCOMA advantages of predominantly local data access, coarse-grain spatial locality, long term temporal locality, minimizing conflict and capacity misses, dynamic data migration and fault containment. These advantages are described further by: B. Falsafi and D. Wood, in "Reactive NUMA: A Design for Unifying S-COMA and CC-NUMA", Proceedings of the 24th Annual International Symposium on Computer Architecture. pp. 229–50, Denver, Colo., June, 1997; and K. Ekanadham, H.-H. Lim, P. Pattnaik, and M. Snir, in "PRISM: An Integrated Architecture for Scalable Shared Memory", Proceedings of the Fourth Symposium on High Performance Computer Architecture, January, 1998.

FIG. 1 is a block diagram of a node coherence controller 100 for a unified scalable shared memory architecture according to the prior art. The unified coherence controller 100 includes both a RAC(s) 102 and a page cache(s) 104. In addition, the unified coherence controller 100 includes: a protocol dispatcher and finite state machine (FSM) 106; fine grain tags 108 for lines in the page cache; a directory 110; a translation table 112; and a network interface 114. A memory bus 116 is also shown. The controller 100 is an integration of typical ccNUMA and SCOMA controller architectures. The translation table 112 may contain information about static home nodes and other information, in addition to serving as an address translation table.

Memory pressure is the amount of memory required to contain the working set of an application. For example, if the entire working set of an application can be placed in the cache, then the memory pressure for that application is low. However, if the working set cannot fit in the cache, then the memory pressure is high.

If the working set of an application does not fit into the RAC, then the overflow data is placed into the page cache. This minimizes the number of remote access requests processed relative to ccNUMA architectures. This improves performance if the working set fits into the page cache (low memory pressure). However, when "memory pressure" is high, performance can be worse than ccNUMA and SCOMA on some applications. This behavior is due to the overhead associated with the constant remapping of pages, and is further described in the above-referenced article by B. Falsafi and D. Wood, entitled "Reactive NUMA: A Design for Unifying S-COMA and CC-NUMA". Dynamically switching between ccNUMA and SCOMA-like architectures on a page basis per node can improve performance when addressing these issues. However, prior art methods and systems directed to dynamic switching suffer from significant internal fragmentation of the page cache, underutilization of pages, and a costly page relocation process. This can result in prohibitive performance degradation.

Thus, it would be desirable and highly advantageous to have a method and system for dynamically changing page types in unified scalable shared-memory architectures that overcome the above problems of the prior art methods and systems for achieving the same.

SUMMARY OF THE INVENTION

The present invention is directed to a method and system for dynamically changing page types in unified scalable shared-memory architectures. The present invention addresses the issue of under-utilized pages in unified scalable shared memory architectures.

According to a first aspect of the invention, there is provided a method for dynamically changing page types in a unified scalable shared-memory architecture. The method includes the step of assigning a default page type of a given page as simple cache only memory architecture (SCOMA). Upon n memory references, a first parameter of the given page is calculated. A second parameter of the given page is calculated, when the first parameter is greater than a first threshold. The page type of the given page is dynamically changed to cache-coherent non-uniform memory architecture (ccNUMA), when the second parameter is greater than a second threshold. The first and the second parameters are one of a page reference probability and one minus a page utilization, the second parameter being different than the first parameter.

According to a second aspect of the invention, the method further includes the step of maintaining the page type of the given page as SCOMA, when the first parameter is less than or equal to the first threshold. According to a third aspect of the invention, the method further includes the step of maintaining the page type of the given page as SCOMA, when the second parameter is less than or equal to the second threshold.

According to a fourth aspect of the invention, the method further includes the step of adjusting at least the first or the second threshold. According to a fifth aspect of the invention, the method further includes the step of adjusting n corresponding to the n memory references.

According to a sixth aspect of the invention, the n memory references correspond to all pages. According to a seventh aspect of the invention, the n memory references correspond only to the given page.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
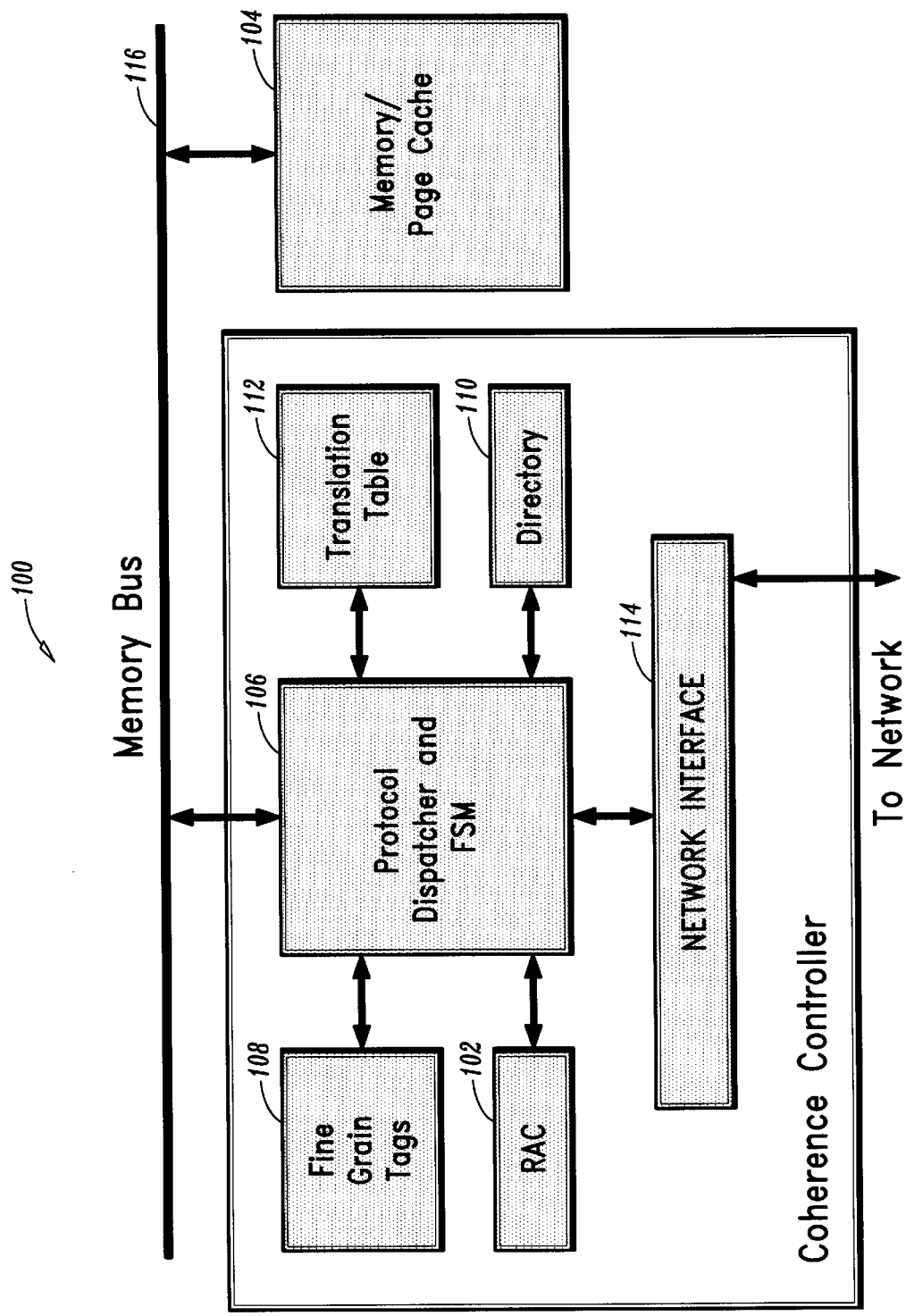
FIG. 1 is a block diagram of a node coherence controller for a unified scalable shared memory architecture according to the prior art.

The present invention is directed to a method and system for dynamically changing page types in unified scalable shared-memory architectures. The present invention reduces the number of frequently accessed pages that are underutilized, thereby reducing the overhead associated with internal fragmentation. These pages are converted from SCOMA to ccNUMA pages.

A general description of the present invention will now be given to introduce the reader to the concepts and advantages of the invention. Subsequently, more detailed descriptions of various aspects of the invention will be provided.

Initially, the present invention advantageously provides that the default page type for a unified page is SCOMA. This is because, as is known, SCOMA performs better than ccNUMA at low memory pressures. Also, initially mapping pages as ccNUMA results in unnecessary additional remote memory accesses for low memory pressures. This additional overhead is not present when initially mapping pages as SCOMA.

Further, the present invention advantageously employs two user-selected thresholds to determined if migration from SCOMA to ccNUMA is warranted. The two thresholds pertain to page utilization and page reference probability.

The page utilization of a page is defined as the number of cache lines accessed in the page divided by the total number of cache lines in the page. A hardware or software mechanism may be used to dynamically calculate the page utilization. The page utilization may be, for example, calculated on each page access. Alternatively, the page utilization may be calculated based on some specified multiple of page accesses. As one example, an access bit can be associated with each cache line and the page utilization can be calculated by checking the state of these access bits. This is but one example of many. One of ordinary skill in the related art would easily be able to contemplate these and similar implementations for calculating page utilization while maintaining the spirit and scope of the present invention.

The page reference probability for a particular page is defined as the number of times the page is referenced divided by the total number of references to all pages. Some examples of quantifying the page reference probability include using the N most recently used pages, incrementing a counter each time a page is referenced, and keeping track of the top C counters. One of ordinary skill in the related art would easily be able to contemplate these and similar implementations for quantifying page reference probability while maintaining the spirit and scope of the present invention.

Therefore, according to the present invention, a unified architecture page dynamically migrates from SCOMA to ccNUMA based upon the following criteria:

(a) the page utilization <= P_THRESHOLD (b) the page reference probability >= R_THRESHOLD Where P_THRESHOLD and R_THRESHOLD are tunable parameters corresponding to the page utilization and the page reference probability, respectively. Both criteria must be met before actual migration can take place. The way in which migration is performed from ccNUMA to SCOMA is not critical to the present invention and, thus, any migration method may be employed.

It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 2:
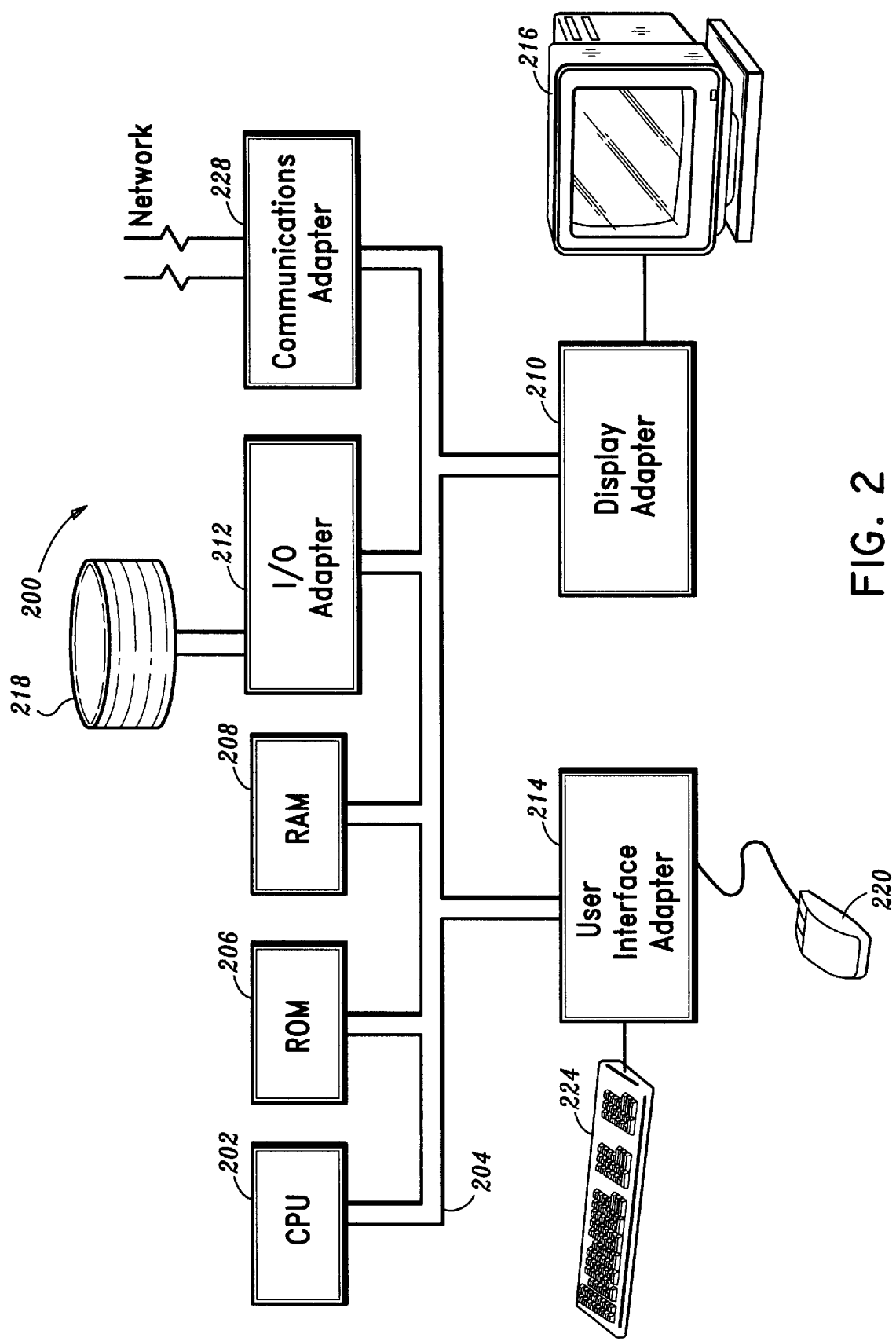
FIG. 2 is a block diagram of a computer processing system to which the present invention may be applied according to an embodiment of the present invention.

FIG. 2 is a block diagram of a computer processing system (computer) 200 to which the present invention may be applied according to an embodiment of the present invention. The computer 200 includes at least one processor (CPU) 202 operatively coupled to other components via a system bus 204. A read only memory (ROM) 206, a random access memory (RAM) 208, a display adapter 210, an I/O adapter 212, a user interface adapter 214, and a communications adapter 228 are operatively coupled to system bus 204.

A display device 216 is operatively coupled to system bus 204 by display adapter 210. A disk storage device (e.g., a magnetic or optical disk storage device) 218 is operatively couple to system bus 204 by I/O adapter 212.

A mouse 220 and keyboard 224 are operatively coupled to system bus 204 by user interface adapter 214. The mouse and keyboard may be used to input and output information to and from the computer 200.

The computer 200 may communicate with another computer(s) through communications adapter 228. The other computer(s) may be part of an intranet or the Internet. The above configuration of computer 200 is merely illustrative and, thus, other configurations are possible while still maintaining the spirit and scope of the present invention.

Figure 3:
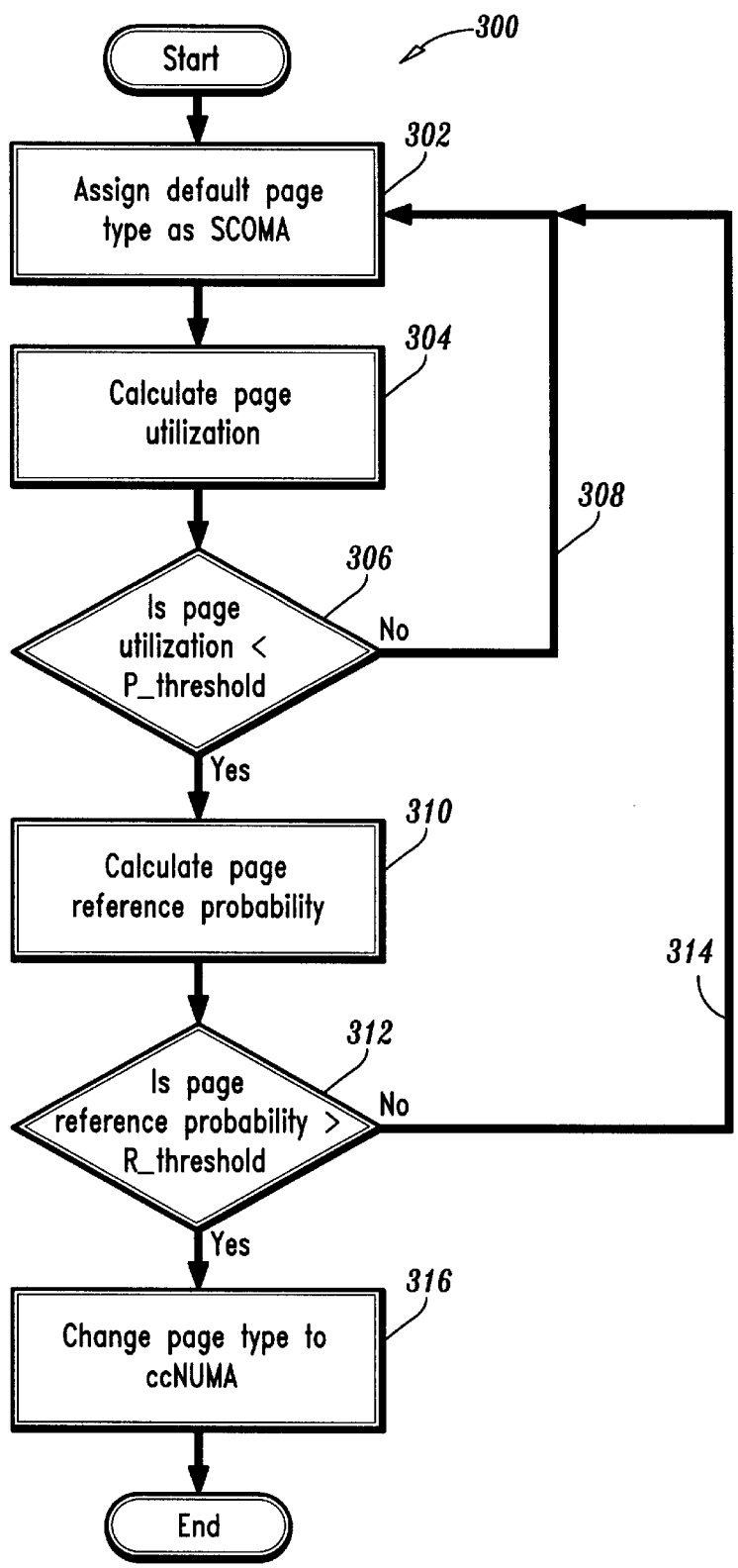
FIG. 3 is a block/flow diagram of a system/method for dynamically changing page types in a unified scalable shared-memory architecture according to an embodiment of the present invention.

FIG. 3 is a block/flow diagram of a system/method for dynamically changing page types in a unified scalable shared-memory architecture according to an embodiment of the present invention. The default page type of a given page is set to SCOMA (step 302). Then, after n memory references, where n is tunable, the page utilization for the given page is calculated (step 304). The n references may correspond to all pages. However, it is preferable that the n references correspond to only the given page. This reduces the computational burden on the computer processing system implementing the present invention.

It is then determined whether the newly calculated page utilization is less than the utilization threshold P_THRESHOLD (step 306). If the newly calculated page utilization is not less than (i.e., it is greater than or equal to) the utilization threshold P_THRESHOLD, then a return is made to step 302 (i.e., the page type of the given page remains SCOMA) (step 308). Otherwise, if the newly calculated page utilization is less than the utilization threshold P_THRESHOLD, then the page reference probability of the given page is calculated (step 310).

It is then determined whether the calculated page reference probability is greater than the page reference threshold R_THRESHOLD (step 312). If the calculated page reference probability is not greater than (i.e., it is less than or equal to) the reference threshold R_THRESHOLD, then a return is made to step 302 (i.e., the page type of the given page remains SCOMA) (step 314). Otherwise, if the calculated page reference probability is greater than the reference threshold R_THRESHOLD, then the page type of the given page is dynamically changed to ccNUMA (step 316). According to another embodiment of the present invention, the page reference probability may be calculated before the page utilization.

It is to be noted that in lieu of determining whether the page utilization is less than P_threshold (i.e., step 306), it may be determined whether one minus the page utilization is greater than P_threshold. Given the teachings of the invention provided herein, one of ordinary skill in the related art will be able to contemplate these and similar implementations of the elements of the invention.

The page utilization threshold P_threshold and the page reference probability threshold R_threshold (as well as the parameter n, which represents the number of references) are adjustable and may be set to a relevant value by one of ordinary skill in the related art so as to maximize the performance of the method and system according to the present invention. For example, one may obtain optimal performance if the page utilizations in the page cache are 0.4. However, for page utilizations less than 0.4, we may get better performance if this page is converted into a ccNUMA page if it is accessed 75% of the time. Therefore, the page utilization threshold P_THRESHOLD is 0.4 and the reference probability threshold R_THRESHOLD is 0.75. It is to be appreciated that the above threshold values are illustrative and other threshold values may be used.

A brief description of a methodology which may be used concurrently with the present invention will now be given. The methodology is known as Multiplexed Simple COMA, and it maps several virtual pages to the same physical page in the attraction memory (cache) to effectively increase the physical page utilization. Multiplexed Simple COMA is described by S. Basu and J. Torrellas, in "Enhancing Memory use in Simple COMA: Multiplexed Simple COMA", Proceedings of the Fourth Symposium on High Performance Computer Architecture, January, 1998. Multiplexed Simple COMA can be used to increase the page utilization in the page. With respect to the present invention, Multiplexed Simple COMA can be used therewith to address the issue of high memory pressure discussed above.

A description of conventional unified architectures or protocols will now be given. Such architectures or protocols include: Reactive NUMA or R-NUMA, as described by B. Falsafi and D. Wood, in "Reactive NUMA: A Design for Unifying S-COMA and CC-NUMA", Proceedings of the 24th Annual International Symposium on Computer Architecture. pp. 229–50, Denver, Colo., June, 1997; PRISM, as described by K. Ekanadham, H.-H. Lim, P. Pattnaik, and M. Snir, in "PRISM: An Integrated Architecture for Scalable Shared Memory", Proceedings of the Fourth Symposium on High Performance Computer Architecture, January, 1998; the MIT StarT-Voyager (which is the latest version of the MIT StarT-NG, the StarT-Voyager described by D. Chiou, B. S. Arvind, M. Beckerle, A. Boughton, R. Greiner, J. E. Hicks, and J. Hoe, in "StarT-NG: Delivering Seamless Parallel Computing", Proceedings of EURO-PAR '95); MIGRAC, as described by V. Soundararajan, M. Heinrich, B. Verghese, K. Gharachorloo, A. Gupta, and J. Hennessy, in "Flexible Use of Memory for Replication/Migration in Cache-Coherent DSM Multiprocessors", Proceedings of the 25th Annual International Symposium on Computer Architecture, pp. 342–55, Barcelona, Spain, June, 1998; VC-NUMA, as described by A. Moga and M. Dubois, in "The Effectiveness of SRAM Network Caches in Clustered DSMs", Proceedings of the Fourth Annual Symposium on High Performance Computer Architecture, January, 1998; and ASCOMA, as described by C.-C. Kuo, J. Carter, R. Kuramkote, and M. Swanson, in "ASCOMA: An Adaptive Hybrid Shared Memory Architecture", Proceedings of the International Conference on Parallel Processing, pp. 207–16, 1998.

Reactive NUMA facilitates dynamic switching between ccNUMA and SCOMA on a page-by-page basis, based upon the reference patterns of the program. The default page type is ccNUMA. This incurs some initial overhead as described above. A page is relocated to a SCOMA page cache after reaching a threshold of cache refreshes, with all lines composing the page removed from the RAC. This may require the pageout of a replaced page. Therefore, the relocation process can be very costly. There is no mechanism to explicitly migrate from a SCOMA page to a ccNUMA page in R-NUMA; SCOMA pages are removed from the page cache when they are replaced. The performance of this system is competitive with ccNUMA and SCOMA, however, it can be up to 57% worse than ccNUMA and SCOMA on some applications when the memory pressure is high. This is further described in the above referenced article by B. Falsafi and D. Wood, entitled "Reactive NUMA: A Design for Unifying S-COMA and CC-NUMA".

The present invention provides better performance results that R-NUMA, because the present invention uses a default SCOMA page (as described above). Also, the present invention advantageously reduces the amount of internal fragmentation in the page cache, since the pages with the lowest utilizations and the highest reference probabilities are migrated to the RAC. This freed space can then be used for more heavily utilized pages.

ASCOMA uses SCOMA as the default page type when the memory pressure is low. When the memory pressure increases to the point where the free page pool drops below a specific threshold, the default page type changes to ccNUMA. ASCOMA also dynamically adjusts the rate of remapping from ccNUMA to SCOMA at high memory pressure by increasing the refetch threshold, the triggering mechanism for converting from ccNUMA to SCOMA pages. The refetch threshold is reduced when the memory pressure is reduced. ASCOMA also adjusts the time interval between initiating a pageout, depending upon the memory pressure, so that pageouts occur less frequently during high memory pressure.

One of the main differences between the ASCOMA page mapping algorithm and the present invention is the fact that ASCOMA does not initially adapt pages from SCOMA to ccNUMA until the memory pressure is high. This can result in frequently accessed pages with relatively low page utilizations remaining in the page cache for extended periods of time, especially for low to moderate memory pressure. Moreover, significant internal fragmentation, underutilization of the page cache memory, and potential performance degradation can also result. The ASCOMA methodologies for dynamically adjusting the rate of remapping from ccNUMA to SCOMA and the time interval between pageouts are orthogonal to this convention and can in fact be used in conjunction with the invention.

It is to be noted that PRISM, StarT-Voyager, MIGRAC and VC-NUMA do not explicitly support the dynamic switching of page types. However, some of these architectures, i.e., PRISM, can be used to implement several different algorithms for dynamically switching between page types.

European patent application EP0780769A1 (hereinafter '769 application), entitled "Hybrid NUMA COMA Caching System and Methods for Selecting Between the Caching Modes", described a method/system wherein pages can be individually typed as either NUMA or COMA. This can occur either statically or dynamically. In fact, NUMA pages can dynamically change types to COMA and vice versa. The invention of the '769 application assumes a hybrid cache where NUMA or COMA lines may reside, and also a COMA cache for pages. It is to be appreciated that while the present invention does not address caching COMA lines in a hybrid cache, such an arrangement may be readily implementation congruent with the present invention but one of ordinary skill in the related art while still maintaining the spirit and scope of the present invention.

The invention of the '769 application used two counters per page, a COMA_hit counter and a COMA-miss counter. The COMA_hit counter is incremented when a COMA line miss occurs in the hybrid cache; however, the line is present in its corresponding page in the COMA cache. The COMA_miss counter is incremented when a COMA line miss occurs in the hybrid cache and a miss for the associated page occurs in the COMA cache. If the number of COMA_hits is much greater than the number of COMA_misses, then a page type remains COMA. Otherwise, the page type is changed to NUMA. This is because the page is heavily accessed, even though there may not always be hits for lines composing the page in the hybrid cache. However, COMA architectures exhibit the best performance, and are most effective when they are heavily utilized and heavily accessed. For example, a hybrid cache may be so small the capacity misses continuously remove lines from the cache. These may be just a few lines that compose a page present in the COMA memory. In this situation, COMA_hits may be much greater than COMA_misses; however, only a few lines within the page are actually used. This results in underutilized COMA memory.

The present invention addresses the issues of page utilization and frequently accessed pages. Also, the present invention only uses one counter per page, plus one additional bit per line within a page. The counter is incremented on every page access. The bit is set the first time a line within the page is accessed. The invention of the '769 application uses two counters per page. In addition, the present invention uses one additional counter for the entire system, which is incremented for every access. Therefore, the present invention requires less overhead (in terms of counters, etc.). Moreover, the present invention addresses the issue of underutilized pages in COMA machines. Therefore, the present invention is more efficient than the invention of the '769 application.

The present invention addresses the issue of underutilized pages in unified scalable shared memory architectures, in the context of dynamically typed pages. The present invention reduces the number of frequently accessed pages that are underutilized, thereby reducing the overhead associated with internal fragmentation.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for dynamically changing page types in a unified scalable shared-memory architecture, comprising the steps of:

assigning a default page type of a given page as simple cache only memory architecture (SCOMA);

upon a number, at n memory references, calculating a first parameter of the given page;

calculating a second parameter of the given page, when the first parameter is greater than a first threshold; and dynamically changing the page type of the given page to cache-coherent non-uniform memory architecture (ccNUMA), when the second parameter is greater than a second threshold, the first and the second parameters being one of a page reference probability and one minus a page utilization, the second parameter being different than the first parameter.

2. The method according to claim 1, further comprising the step of maintaining the page type of the given page as SCOMA, when the first parameter is one of less than and equal to the first threshold.

3. The method according to claim 1, further comprising the step of maintaining the page type of the given page as SCOMA, when the second parameter is one of less than and equal to the second threshold.

4. The method according to claim 1, further comprising the step of adjusting at least one of the first and the second thresholds.

5. The method according to claim 1, further comprising the step of adjusting n corresponding to the n memory references.

6. The method according to claim 1, wherein the n memory references correspond to all pages.

7. The method according to claim 1, wherein the n memory references correspond only to the given page.

8. The method according to claim 1, wherein the page utilization of a particular page is defined as a number of cache lines accessed in the particular page divided by a total number of cache lines in the particular page.

9. The method according to claim 1, wherein the page reference probability for a particular page is defined as a number of times the particular page is referenced divided by a total number of references to all pages.

10. A program storage device readable by machine, tangibly embodying a program of instructions executable by the machine to perform steps for dynamically changing page types in a unified scalable shared-memory architecture, said method steps comprising:

assigning a default page type of a given page as simple cache only memory architecture (SCOMA);

upon a number, at n memory references, calculating a first parameter of the given page;

calculating a second parameter of the given page, when the first parameter is greater than a first threshold; and dynamically changing the page type of the given page to cache-coherent non-uniform memory architecture (ccNUMA), when the second parameter is greater than a second threshold, the first and the second parameters being one of a page reference probability and one minus a page utilization, the second parameter being different than the first parameter.

11. The program storage device according to claim 10, further comprising the step of maintaining the page type of the given page as SCOMA, when the first parameter is one of less than and equal to the first threshold.

12. The program storage device according to claim 10, further comprising the step of maintaining the page type of the given page as SCOMA, when the second parameter is one of less than and equal to the second threshold.

13. The program storage device according to claim 10, further comprising the step of adjusting at least one of the first and the second thresholds.

14. The program storage device according to claim 10, further comprising the step of adjusting n corresponding to the n memory references.

15. The program storage device according to claim 10, wherein the n memory references correspond to all pages.

16. The program storage device according to claim 10, wherein the n memory references correspond only to the given page.

17. A system for dynamically changing page types in a unified scalable shared-memory architecture, comprising:

means for assigning a default page type of a given page as simple cache only memory architecture (SCOMA);

means for calculating a first parameter of the given page, upon a number, at n, memory references;

means for calculating a second parameter of the given page, when the first parameter is greater than a first threshold; and means for dynamically changing the page type of the given page to cache-coherent non-uniform memory architecture (ccNUMA), when the second parameter is greater than a second threshold, the first and the second parameters being one of a page reference probability and one minus a page utilization, the second parameter being different than the first parameter.

18. A system for dynamically changing page types in a unified scalable shared-memory architecture, comprising:

an assignment module adapted to assign a default page type of a given page as simple cache only memory architecture (SCOMA);

a calculation module adapted to calculate a first parameter of the given page upon a number, at n, memory references, and a second parameter of the given page when the first parameter is greater than a first threshold; and a dynamic change module adapted to dynamically change the page type of the given page to cache-coherent non-uniform memory architecture (ccNUMA), when the second parameter is greater than a second threshold, the first and the second parameters being one of a page reference probability and one minus a page utilization, the second parameter being different than the first parameter.

19. The system according to claim 18, further comprising a maintenance module adapted to maintain the page type of the given page as SCOMA, when the first parameter is one of less than and equal to the first threshold.

20. The system according to claim 18, further comprising a maintenance module adapted to maintain the page type of the given page as SCOMA, when the second parameter is one of less than and equal to the second threshold.

21. The system according to claim 18, further comprising an adjustment module adapted to adjust at least one of the first and the second thresholds.

22. The system according to claim 18, further comprising an adjustment module adapted to adjust n corresponding to the n memory references.

23. The system according to claim 18, wherein the n memory references correspond to all pages.

24. The system according to claim 18, wherein the n memory references correspond only to the given page.

* * * * *